US012711498B2

(12) United States Patent
Arora et al.

(10) Patent No.: US 12,711,498 B2
(45) Date of Patent: Aug. 18, 2026

(54) LI-FI PAYMENT NETWORK WITH QUANTUM KEY DISTRIBUTION CHANNELS

(71) Applicant: Bank of America Corporation, Charlotte, NC (US)

(72) Inventors: Saurabh Arora, Gurugram (IN); Sandeep Kumar Chauhan, Miyapur Hyderabad (IN); Puneetha Polasa, Secunderabad Telangana (IN); Mallidi Bhagya Lakshmi Sudha Lavanya, Narsingi Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 108 days.

(21) Appl. No.: 18/785,162

(22) Filed: Jul. 26, 2024

(65) Prior Publication Data

US 2026/0030620 A1 Jan. 29, 2026

(51) Int. Cl.
*G06Q 20/38* (2012.01)
*G06Q 20/20* (2012.01)
(Continued)

(52) U.S. Cl.
CPC ....... *G06Q 20/3829* (2013.01); *G06Q 20/209* (2013.01); *G06Q 20/327* (2013.01);
(Continued)

(58) Field of Classification Search
CPC .................... G06Q 20/00–425; H04L 9/00–50
See application file for complete search history.

(56) References Cited

U.S. PATENT DOCUMENTS 8,615,131 B2 12/2013 El-Sana et al.
10,505,631 B1 * 12/2019 Sundar Pal ............ H04L 27/26
(Continued)

FOREIGN PATENT DOCUMENTS

CN 109255113 1/2019
CN 111539414 8/2020
(Continued)

OTHER PUBLICATIONS

"Quantum Key Distribution," Wikipedia, Retrieved on Jul. 22, 2024.

(Continued)

*Primary Examiner* — Ari Shahabi
(74) *Attorney, Agent, or Firm* — Weiss & Arons LLP

(57) ABSTRACT

Apparatus and methods for a quantum-key secured li-fi payment network with quantum key distribution channels are provided. A customer's device may communicate, directly or through intermediate devices and computer systems, over a li-fi network with a point-of-sale terminal through two or more channels. One channel may be a standard li-fi channel. The standard li-fi channel may be secured. The second channel may be a quantum key distribution channel. A bill may be transmitted to the customer's device over the li-fi network. The customer may select an option to pay the bill. The selection, along with information to authorize and process the payment, may be transmitted over the li-fi network to the POS terminal. The POS terminal may process the payment and generate a receipt. The receipt may be transmitted to the customer's device over the li-fi network.

4 Claims, 7 Drawing Sheets

(51) Int. Cl.
*G06Q 20/32* (2012.01)
*H04L 9/08* (2006.01)

(52) U.S. Cl.
CPC ....... *H04L 9/0852* (2013.01); *G06Q 2220/00* (2013.01); *H04L 2209/56* (2013.01)

(56) References Cited

U.S. PATENT DOCUMENTS 10,565,066 B1* 2/2020 Ramesh .............. H04L 63/0281
10,727,941 B1* 7/2020 Kanagarajan ............ G08G 5/22
11,501,061 B2 11/2022 Foncubierta-Rodriguez et al.
11,887,079 B2* 1/2024 Godshall .............. G06Q 20/102
2007/0016534 A1* 1/2007 Harrison ............ H04B 10/1125 705/65
2007/0212063 A1* 9/2007 Meli ................... H04J 14/0227 398/30
2017/0140373 A1* 5/2017 de Villiers ....... G06Q 20/38215
2018/0041273 A1* 2/2018 Chiang ................ H04B 10/116
2018/0227053 A1* 8/2018 Chiang ................... H04W 4/46
2020/0204255 A1* 6/2020 Deng ................... H04B 10/116
2020/0274614 A1* 8/2020 Sondericker, III ... H04B 10/116
2020/0382958 A1* 12/2020 Wang .................... H04W 12/06

FOREIGN PATENT DOCUMENTS

CN 111738251 10/2020
CN 111767732 10/2020
CN 112101357 12/2020
CN 112651448 4/2021
CN 114201975 3/2022
CN 114332476 4/2022

OTHER PUBLICATIONS

Shuang Wang, “Symmetric private information retrieval supported by quantum-secure key-exchange network,” https://doi.org/10.1038/s41377-022-00996-1, 2022.

* cited by examiner

LI-FI PAYMENT NETWORK WITH QUANTUM KEY DISTRIBUTION CHANNELS

FIELD OF TECHNOLOGY

Aspects of the disclosure relate to providing apparatus and methods for a quantum-key secured li-fi payment network that includes one or more quantum key distribution channels.

BACKGROUND OF THE DISCLOSURE

Currently, there may be multiple methods to request, receive, and process payments through a point of sale ("POS") system. These methods may require physical contact (e.g., touching, swiping, or inserting a credit card). Some methods may use wireless networks, either local (e.g., bluetooth or NFC), or wide-area (e.g., the Internet or cellular networks). However, these methods may not be secure or may sacrifice range for security or vice versa. And these networks may be unavailable in certain locations.

In addition, conventional POS systems may only be able to serve one customer (or a limited number) at a time. Further, conventional POS systems may have trouble transmitting bills or requests for payment to specific customers within a larger group of customers, with or without secure communication channels.

"Li-fi" (light fidelity) networks use light pulses, visible or non-visible, to send digital data wirelessly, instead of radio or other signals (as in current wi-fi and cellular networks). Li-fi networks may require transmission, receiving, and other hardware. Transmitters and receivers may require specific hardware to access a li-fi network. A li-fi network may utilize routers, switches, or other types of hubs. These hubs may be installed in a position to reach as many network devices as possible for greater coverage (e.g., on a ceiling). Current li-fi networks and network hardware can achieve transmission speeds greater than 1 gigabit per second.

Securing li-fi networks may be difficult. The light pulses may be intercepted or read by other devices and malicious actors. Standard encryption protocols may be broken, especially with an increasing prevalence of quantum computation.

Quantum-secured encryption may be available. One method of quantum security is the use of quantum keys along with a dedicated quantum key distribution channel.

Currently, there is no apparatus or method available for a "li-fi" payment network that is secured with quantum keys. Such a network may allow for payment processing to multiple customers at one time and may work even when cellular or wi-fi networks are unavailable.

Therefore, it would be desirable for apparatus and methods for quantum-key secured li-fi payment networks that include quantum key distribution channels.

SUMMARY OF THE DISCLOSURE

It is an object of this disclosure to provide apparatus and methods for a quantum-key secured li-fi payment network with one or more quantum key distribution channels.

A quantum-key secured li-fi payment network computer program product is provided. The computer program product may include executable instructions. The executable instructions may be stored on non-transitory memory and may be executed by a processor on one or more computer systems.

The executable instructions may receive, at a point-of-sale ("POS") terminal and over a li-fi network, a bill request transmitted from a mobile device belonging to a customer.

The POS terminal may include a POS quantum receiver, a POS li-fi transmitter, and a POS li-fi receiver.

The mobile device may include a device quantum transmitter, a device li-fi transmitter, and a device li-fi receiver.

The bill request may include a quantum key unique to the mobile device.

The instructions may dedicate a quantum key distribution channel between the POS terminal and the mobile device.

The instructions may receive a quantum key from the mobile device over the quantum key distribution channel.

The instructions may generate, at the POS terminal, a bill specific to the customer. The bill may be encrypted with the quantum key.

The instructions may determine an optimal route over the li-fi network between the mobile device and the POS terminal.

The instructions may transmit the bill to the mobile device over the optimal route.

The customer's device may receive the bill. The instructions may present, on a screen or other input of the customer's device, to the customer one or more selectable options to pay the bill.

When the customer selects one of the one or more selectable options, the instructions may transmit the selection to the POS terminal over the li-fi network through the optimal route.

The POS terminal may receive the selection of payment.

The instructions may pay the bill, at the POS terminal, as instructed by the selection.

The instructions may mark the bill as paid and transmit a receipt to the customer's mobile device over the li-fi network.

In an embodiment, the optimal route may include a central hub between the POS and the customer's device. The central hub may include a hub quantum receiver, a hub li-fi transmitter, and a hub li-fi receiver.

In an embodiment, the li-fi network may include two or more zones.

In an embodiment, each of the two or more zones may include a zone central hub.

In an embodiment, each of the two or more zones may include a zone router.

In an embodiment, each of the two or more zones may include two or more consumer mobile devices in communication with the li-fi network.

In an embodiment, the optimal route may be determined through one or more artificial intelligence/machine learning ("AI/ML") algorithms.

In an embodiment, the transmission of the selection may be encrypted with the quantum key.

In an embodiment, the selection may include payment information and a payment authorization.

In an embodiment, the bill may include one or more options to modify the payment amount, such as for example, various options for tipping.

In an embodiment, the li-fi network may be in communication with an outside network, such as the Internet or other external network.

In an embodiment, the instructions may further create two or more secure channels between the POS and the customer device. One of the two or more secure channels may be the quantum key distribution channel.

In an embodiment, the instructions may further record information on a distributed ledger.

In an embodiment, the distributed ledger may be a blockchain.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
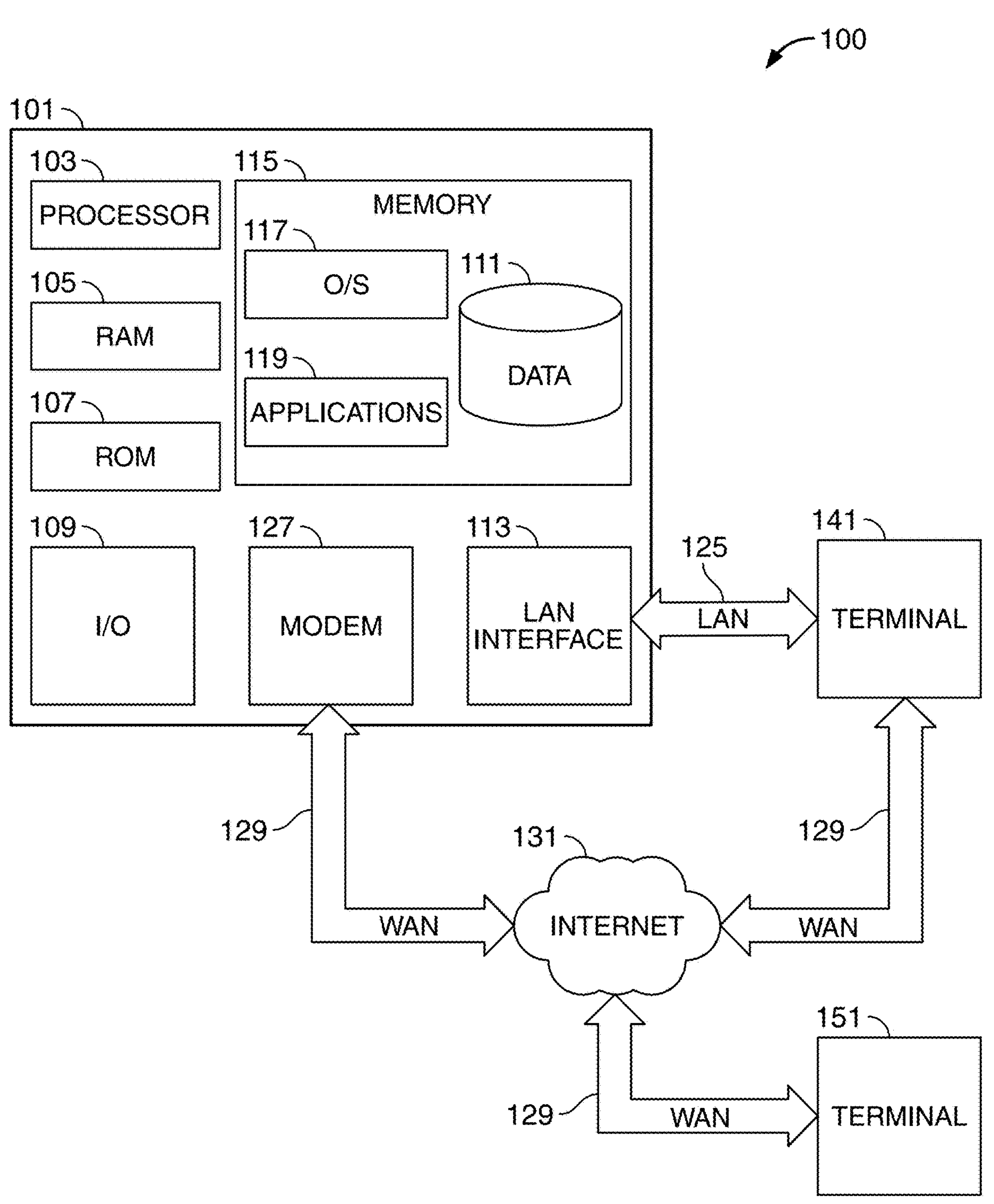
FIG. 1 shows an illustrative apparatus in accordance with principles of the disclosure.

It is an object of this disclosure to provide apparatus and methods for a quantum-key secured li-fi payment network.

Li-fi networks may utilize flashes of light (in the visible or not-visible spectrums) to transmit and receive data, instead of wires or radio signals. Transmitters and receivers may require specific hardware to access a li-fi network.

Standard network equipment, such as routers and switches, may be used with a li-fi network. Atypical equipment may also be used. A li-fi network may utilize routers or other hubs. These routers and hubs may be installed in a position to reach as many network devices as possible for greater coverage (e.g., on a ceiling). Speeds greater than 1 gbps have been achieved with current li-fi networks.

Li-fi network equipment and access points may require visible line-of-sight between devices to function correctly. Any computer device, mobile or stationary, with the appropriate li-fi equipment (e.g., transmitters and receivers) may access a li-fi network.

In various embodiments, a li-fi network may transmit data from device to device, creating a chain or swarm of devices in a network, extending the range and power of a li-fi network.

Information or data transmitted over a li-fi network may be encrypted or unencrypted. One security feature of a li-fi network is that it requires line-of-sight to function, so a malicious actor outside of line-of-sight of the network may not be able to access the li-fi network. Line-of-sight may be monitored and modified easily, with cameras and moveable obstructions.

Quantum keys transmitted over a dedicated quantum key distribution channel may also increase the security of the li-fi network.

To transmit and receive quantum keys, a quantum transmitter and a quantum receiver may be required.

Quantum keys may include data about one or more photons, including spin data. Normal, non-quantum keys may include only bits of data representing alphanumeric characters and special characters. Quantum keys may include those bits of data along with spin data on photons. Non-quantum equipped devices cannot receive, transmit, or interpret the spin data. This may allow for additional security beyond normal non-quantum keys.

In an embodiment, metadata details may be captured for every device available on a Li-fi network. A device map may be created in real-time as a reference for individual device key mapping. The device map may include a device-ID, a Li-fi Zone ID and a device risk profile for each device.

The device risk profile for each device may be generated by a computer program automatically. The device risk profile for each device may be generated by a computer program through one or more artificial intelligence/machine learning algorithms. The device risk profile may take into account the device hardware, device software installed (e.g., each application, whether the applications have been updated, malware and antivirus applications), and other potential channels for malicious activity.

Each device may generate a customized quantum key. A quantum key cannot be maliciously attacked by other devices. A dedicated quantum key distribution channel may be established for direct quantum key transfer between each device and a POS terminal or other device (such as a central hub).

Quantum keys are provably secure. Generating a quantum key may include encoding a random value or information in quantum states, including spin states. Photons may be used. Photons may be transmitted over a li-fi network. In standard quantum key distribution channels, the photons are transmitted over fiber-optic lines.

Quantum keys may take advantage of measuring quantum states (when measured, quantum states may collapse into a single value), or entanglement properties.

The quantum key(s) may be transmitted over a dedicated quantum key channel. The dedicated quantum key channel may run on the li-fi network, as transmission of quantum keys may include transmission of photons (i.e., light). Eavesdropping of the dedicated channel may be detectable. Other information, such as e.g., the bill or payment information, may be transmitted over different channels of the li-fi network.

Quantum keys may be transmitted through a quantum transmitter. A quantum transmitter may include one or more qubits. Quantum keys may be received by a quantum receiver. A quantum receiver may include one or more qubits. In an embodiment, a quantum transmitter may also act as a quantum receiver, and a quantum receiver may also act as a quantum transmitter.

In various embodiments, the provided payment network may include a mix of li-fi and traditional networks. For example, a central hub or router may include a capability to connect with and access an outside network, through a modem or other standard communication device. Information and data may be received through the li-fi network and then transmitted over legacy communication protocols (wi-fi, LAN, bluetooth, cellular signals, etc.) to an outside (of the li-fi network) network, such as the Internet.

A quantum-key secured li-fi payment network computer program product is provided. The computer program product may include executable instructions. The executable instructions may be stored on non-transitory memory and may be executed by a processor on one or more computer systems. All or some portion (e.g., front-end or back-end) of the computer program product may be installed on various computer systems.

Multiple processors may increase the speed and capability of the program. The executable instructions may be stored in non-transitory memory on one or more computer systems.

Quantum processors to allow for quantum key generation, transmission, and reception may also be included. Quantum computing may be referred to as the use of quantum-mechanical phenomena such as superposition and entanglement to perform computations. The smallest bit in a quantum computer may be called a qubit.

The amount, and type, of calculations that a quantum computer may be able to process may grow exponentially with the number of qubits included in the quantum computer's processing core. A quantum computer with "N" qubits may be able to simultaneously represents $2^n$ states. Therefore, two qubits may hold four states, three qubits may hold eight states, fifty qubits may hold 1, 125, 899, 906, 842, 624 states, and 10,000 qubits may hold $2^{10000}$ states.

Quantum processors are associated with vastly improved efficiencies over classical computers. For example, whereas classical computers represent data in bits, which can be either 0 or 1, quantum processors use qubits which utilize superposition (i.e., the ability to be in multiple states at the same time until it measured) to allow for a state of 0, 1, or any probability of being 0 or 1. Qubits may also allow for spin data of photons to be measured, accessed, utilized, and manipulated.

The probabilities can be manipulated using matrix-based quantum gates, which are analogous to classical logic gates. Qubits are therefore able to represent many more data possibilities than a bit-based system of the same size. This may allow for greater speed and less memory usage than classical systems.

A qubit in a state of superposition does not have a defined value because it may hold many potential values at the same time. When measured, the qubit wave function collapses to a defined state. When an entangled qubit is in a state of superposition, each of its entangled connections is also in a state of superposition. These combinations of uncertainties may exponentially increase the power of quantum computers. Superposition may also be used for certain embodiments of quantum keys.

The quantum processor may include a default number of quantum threads. Each quantum thread may include a default number of quantum circuits. Quantum circuits, in turn, may refer to hardware and software based computational models that include quantum gates and are used for executing quantum computations.

For example, in some embodiments, at least one of the quantum circuits may include a Toffoli gate. A feature of the Toffoli gate is its universal nature, i.e., it is able to represent classical computer operations as well as quantum operations.

In certain embodiments, at least one of the quantum circuits may include a Hadamard gate. A feature of the Hadamard gate is the ability to represent a superposition state.

Other standard components of a computer system may be present. The computer system may be a router, switch, hub, server, mobile device, or other type of computer system. A server or more powerful computer may increase the speed at which the computer program may run. Portable computing devices, such as a smartphone, laptop or tablet, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

Each computer system that is connected to the li-fi network may include, among other components some or all of the following: a communication link to an outside network, li-fi receiver(s) and li-fi transmitter(s) to link to the li-fi network, quantum transmitters, quantum receivers, a processor or processors, and a non-transitory memory configured to store executable data configured to run on the processor. The executable data may include an operating system, li-fi network protocols, quantum key distribution channel protocols, and the quantum-key secured li-fi payment network computer program.

A processor or processors may control the operation of each computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

In addition to the li-fi network hardware and quantum key distribution channel hardware, a communication link to an outside network may enable communication with other computers as well as any server or servers. The communication link may include any necessary hardware (e.g., antennae) and software to control the link. Any appropriate communication link may be used, such as Wi-Fi, bluetooth, LAN, and cellular links. In an embodiment, the network used may be the Internet. In another embodiment, the network may be an internal intranet or other network.

In addition to a standard communication link to enable communication with a network outside the li-fi network, the computer systems may include any necessary hardware and software to control the link with a li-fi network. This hardware and software may be different than the hardware and software used by the communication link.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive and less resilient.

The executable instructions may receive, at a li-fi equipped point-of-sale ("POS") terminal and over a li-fi network, a bill request transmitted from a li-fi equipped mobile device belonging to a customer. The li-fi network may be continuous (as in a wi-fi network) or may be activated upon request (by an individual, an entity, or a device).

The bill request may include a quantum key unique to the mobile device, along with other information to identify the customer and bill. Including a unique quantum key may be one method of ensuring the bill is routed to the correct customer.

The instructions may dedicate a quantum key distribution channel between the POS terminal and the mobile device. The only information transmitted over the quantum key distribution channel may be the quantum key(s). The quantum key distribution channel may use the li-fi network to transmit and receive information.

The instructions may receive a quantum key from the mobile device over the quantum key distribution channel.

The instructions may generate, at the POS terminal, a bill specific to the customer. For example, at a restaurant, every customer may have a separate bill, as each customer may order something different; therefore, each customer should require a bill specific to that customer. Any appropriate method of tracking a customer and a customer's order may be used. The bill may be encrypted with the quantum key. Encrypting the bill may ensure that only the customer can view the bill. Any appropriate encryption algorithm or method may be used.

The instructions may determine a route over the li-fi network between the mobile device and the POS terminal. The route may be an optimal route. A route may be directly from the POS to the mobile device. However, if the POS and mobile device are not in a direct line of sight, a different route would be required. A route may transmit the information from POS to device to device, through a central hub, through a router or switch, or through multiple computer systems. This may be referred to as a swarm of devices or swarm network. As long as each step in the route is in line of sight with the previous step, the data/information may be transmitted through the li-fi network. Various factors may be used to determine which route is optimal. These factors may include, inter alia, distance, time, number of steps, the security at each step, location, zone, bandwidth, and other factors. An artificial intelligence/machine learning algorithm may be used to analyze the factors and determine an optimal route.

The executable instructions may search the li-fi network for one or more additional computer systems connected to or in communication with the li-fi network. When an additional system is discovered, the instructions may determine its location, bandwidth, as well as which other systems are in direct line of sight and able to communicate with the system over the li-fi network.

In an embodiment, the instructions may create a network map of computer systems connected to or communicating with the li-fi network. This network map may be shared with an administrator. The network map may be encrypted.

In an embodiment, the search may be continuous. In an embodiment, the search may occur at predetermined intervals (e.g., every minute, every hour, every day, every 10 days, etc.). The pre-determined intervals may be adjusted manually or automatically by the computer program.

The instructions may transmit the bill to the mobile device over the optimal route, or another route. Using the optimal route may increase the speed and security of the transmission.

The customer's device may receive the bill over the li-fi network. In an embodiment, the bill may be encrypted with the quantum key. In another embodiment, the bill may be encrypted with a non-quantum key.

In an embodiment, the POS may handle multiple bill requests at one time, up to the bandwidth available over the li-fi network.

The instructions may be configured to present to the customer, on a screen or other input of the customer's device, one or more selectable options to pay the bill. Any suitable GUI may be used. The GUI may be customizable by the customer, administrator, or other user. For example, the instructions may present the bill amount, a filled-in or blank tipping amount, a first credit card payment option, a second card payment option, a debit card payment option, a cryptocurrency payment option, a cash payment option, or other payment option.

In an embodiment, the customer may adjust and modify the available payment options. In an embodiment, the POS may include available payment options. For example, some POS systems may only accept certain types of credit cards and not others. This information may be shared with the customer through the instructions.

The customer may select one of the options presented to it on the device. Any appropriate selection method may be used and may be varied by the type and capabilities of the customer's mobile device. For example, a touch screen device may allow for a touch selection. Other devices may allow for voice selection or other input types.

When the customer selects one of the one or more selectable options, the instructions may transmit the selection to the POS terminal over the li-fi network through the optimal route.

The selection may include all information and data necessary to process a payment (e.g., a credit card number and expiration date). The data may be encrypted. Any suitable encryption method may be used.

The instructions may pay the bill, at the POS terminal, as instructed by the selection and using the data and information provided with the selection. In an embodiment, the POS terminal may communicate with an outside network (e.g., the Internet) through a communications link to that outside network to pay the bill as instructed.

When the payment is complete (authorized, allowed, and processed), the instructions may mark the bill as paid and transmit a receipt to the customer's mobile device over the li-fi network. The receipt may be in any appropriate format, including a picture, a pdf, an email, a text message, or other format.

In an embodiment, the optimal route may include a central hub between the POS and the customer's device. For example, a central hub may be located at or near a ceiling. This may provide a visual line of sight to more devices than placement on a wall or floor. The central hub may be a router, switch, or other network device. The central hub may be a computer system. The central hub may include li-fi receivers and li-fi transmitters. The central hub may be configured to communicate with multiple devices or computer systems over the li-fi network at one time. The central hub may be configured to create and manage multiple communication channels at one time. The hardware may be a limiting factor on the maximum number of channels available.

In an embodiment, the li-fi network may include two or more zones. A zone may be a physical area where each device located within the zone may be able to communicate over the li-fi network with other devices within the zone. Zone areas may be malleable. Zones may be adjusted automatically by the computer program. Zones may be adjusted manually.

One or more devices or computer systems in each zone may be able to communicate over a li-fi network with devices or computer systems in another zone. Multiple zones may increase the range and reach of the quantum-key secured li-fi payment network. Adding a new zone to an existing network may increase the range and reach of the network.

In an embodiment, each of the two or more zones may include a zone central hub. For example, a zone central hub may be able to communicate over the li-fi network with devices within a fifty-foot radius of the hub. That fifty-foot radius may define the outer border of the zone. In various embodiments, the zone may be larger or smaller than the radius of the central hub. Zones may be of various sizes, or the same size. Zones may change size as devices move in or out of the zone.

In an embodiment, one or more of the zones may include two or more central hubs, increasing the area of that zone.

In an embodiment, each of the two or more zones may include a zone router. The zone router may be a separate device or system than the central hub. The zone router may be a part of the central hub.

In an embodiment, each of the two or more zones may include two or more consumer mobile devices in communication with the li-fi network. Multiple devices may create a swarm of devices, wherein each device may communicate over the li-fi network with another device, e.g., like a link in a chain. Multiple devices may increase the area of a zone.

In an embodiment, the optimal route may be determined through one or more artificial intelligence/machine learning ("AI/ML") algorithms. Any suitable AI/ML algorithms may be used. Each algorithm may dynamically evaluate one or more factors in its analysis. The algorithm(s) may iterate. The algorithm(s) may be trained on a training set of data. The training set may be created data or actual data. The algorithms may be checked by one or more system administrators.

Each factor may be analyzed on a scale. The scale may be of any type. For example, the scale may be a number from 0 through 10, with 10 being most likely to save time and 0 being least likely to save time. The scale may be adjusted dynamically by the program. The scale may be adjusted manually.

In an embodiment, the transmission of the selection may be encrypted. Any appropriate encryption method may be used, including quantum key encryption.

In an embodiment, the selection may include payment information and a payment authorization, and any other data necessary to authorize and process a payment. Different payment types may require different data.

In an embodiment, the bill may include one or more options to modify the payment amount, such as for example, various options for tipping.

In an embodiment, the li-fi network may be in communication with an outside network, such as the Internet or other external network.

In an embodiment, the instructions may further create two or more secure channels between the POS and the customer device. One of the two or more secure channels may be the quantum key distribution channel.

In an embodiment, the instructions may further record information on a distributed ledger or other database. The information may be the bill request, the bill, payment authorization, receipt, and other information and data.

The database may be located at the computer system. The database may be located remotely from the computer system. The database may be located at or near the computer system with the computer program. The database may be located remotely from the computer system with the computer program. The database may be accessed over an internal or external network.

In an embodiment, the database may be distributed across multiple computer systems or servers. The distributed systems or servers may be geographically distant.

In an embodiment, the database may be encrypted. Encrypting the database may be required depending on the sensitivity of the network or computer systems. Any appropriate encryption protocol or method may be used.

In an embodiment, the distributed ledger may be a blockchain.

An apparatus for a quantum-key secured li-fi payment network is provided. The apparatus may include a li-fi and quantum equipped point-of-sale terminal ("POS"), a li-fi network, one or more li-fi and quantum equipped customer devices, and one or more central hubs. The central hub(s) may also be equipped with li-fi and quantum equipment.

The li-fi POS may include a POS operating system, a quantum-key secured li-fi payment network application, one or more POS li-fi transmitters, one or more POS li-fi receivers, one or more quantum transmitters, and one or more quantum receivers.

Quantum transmitters and quantum receivers may include any equipment (hardware and software) necessary to transmit and receive quantum information, including quantum keys. Current quantum transmission may include fiber-optic equipment. As fiber-optic equipment includes the transmission of data through light pulses, similar equipment may be used in a li-fi network.

In an embodiment, li-fi transmitters and li-fi receivers may include quantum transmitters and quantum receivers. In an embodiment, li-fi transmitters and li-fi receivers may act as (i.e., take the place of) quantum transmitters and quantum receivers.

The li-fi network may include one or more li-fi routers and one or more li-fi switches. Li-fi routers and li-fi switches may be similar to standard network routers and switches, but equipped to receive and transmit li-fi data.

The one or more li-fi equipped customer devices may each include a customer device operating system, a copy of the quantum-key secured li-fi payment network application, one or more customer device li-fi transmitters, one or more customer device li-fi receivers, one or more quantum receivers, and one or more quantum transmitters.

The one or more central hubs may each include a central hub operating system, a copy of the quantum-key secured li-fi payment network application, one or more central hub li-fi transmitters, one or more central hub li-fi receivers, a central hub communication link configured to communicate with an outside network, such as the Internet, one or more quantum receivers, and one or more quantum transmitters.

A customer, through one of the one or more customer devices, may transmit a bill request, including a quantum key unique to the one of the one or more customer devices, over the li-fi network to one of the one or more central hubs. The quantum key may be transmitted over a dedicated quantum key distribution channel. The quantum key distribution channel may be between the device, the POS and one or more central hubs.

The one of the one or more central hubs may transmit the bill request to the POS.

The POS terminal may generate a bill according to the bill request, encrypted with the quantum key, specific to the customer, and transmit the bill to the one of the one or more central hubs.

The one of the one or more central hubs may determine an optimal or other route over the li-fi network between the POS and the customer's device. The optimal route may be directly between the POS and the device, may include routing through one or more central hubs, and may include routing through central hubs as well as other devices connected to the network. A route may be optimal depending on various factors, such as distance, time, number of systems/devices the information is passing through, the security of each system/device, as well as other factors.

The one of the one or more central hubs may transmit the bill to the customer device over the optimal route or other route.

The customer's device may receive the bill.

The li-fi payment application may present/display, on the customer's device, one or more selectable options to pay the bill to the customer. For example, the options may be: pay through a first credit card, a second credit card, cash, debit card, credit account, add to the amount (e.g., for a tip), etc.

When the customer selects one of the one or more selectable options, the customer's device may transmit the selection to one of the one or more central hubs over the li-fi network and the optimal route. The one of the one or more central hubs may transmit the selection to the POS terminal over the li-fi network. The one of the one or more central hubs may pay the bill as instructed by the selection. Paying the bill may include communicating over the central hub communication link with an outside network, such as the Internet or a dedicated payment authorization network (e.g., for a credit card system). The POS terminal may mark the bill as paid. and generate a receipt.

The POS terminal may transmit the receipt to the one of the one or more central hubs over the li-fi network. The one of the one or more central hubs may transmit the receipt to the customer's device over the li-fi network through the optimal route or another route.

In an embodiment, the li-fi network may further include two or more zones. Each zone may include one of the one or more li-fi routers, one of the one or more li-fi switches, one of the one or more central hubs, and one or more of the one or more li-fi equipped customer devices.

In an embodiment, a router, a switch, and/or a customer device may act as a central hub as well.

In an embodiment, each of the one or more central hubs may be bypassed, and the customer devices may communicate with each other and the POS directly.

In an embodiment, the optimal route may be determined through one or more artificial intelligence/machine learning ("AI/ML") algorithms.

A method for a quantum-key secured li-fi payment network is provided. The method may include the step of generating, at a li-fi equipped customer device, a bill request comprising a quantum key unique to the customer device.

A li-fi network, like many other networks, may include multiple channels for data transfer. The more channels, the more data that may be transferred at one time.

The method may include generating, at the customer device, a quantum key. This may include using the quantum qualities of superposition or entanglement. A quantum key may include more information than standard bits of 0s and 1s, such as the spin of photons.

The method may include dedicating/forming a quantum key distribution channel between the customer device and a point-of-sale terminal ("POS") comprising li-fi equipment and a quantum receiver. The quantum key distribution channel may be a dedicated channel on the li-fi network.

The method may include the step of transmitting the bill request over the li-fi network to a li-fi equipped point-of-sale terminal ("POS").

The method may include the step of generating, at the POS, an encrypted bill.

The method may include the step of transmitting, from the POS to a central hub, the encrypted bill.

The method may include the step of determining, at the central hub, an optimal route over the li-fi network to and from the POS and the customer device.

The method may include the step of creating a second secure channel between the POS and customer device over the li-fi network and the optimal route.

The method may include the step of transmitting the bill to the customer device through the second secure channel.

The method may include the step of receiving the bill at the customer device.

The method may include the step of displaying, on the customer device, one or more selectable options to pay the bill.

The method may include the step of selecting one of the one or more selectable options and receiving the selection at the customer device.

The method may include the step of transmitting the selection to the POS over the secure channel.

The method may include the step of processing a payment of the bill as instructed by the selection.

The method may include the step of receiving, at the POS, acknowledgment of the payment.

The method may include the step of marking, at the POS, the bill as paid.

The method may include the step of generating, at the POS, a receipt.

The method may include the step of transmitting the receipt to the customer device over the second secure channel.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic or light waves traveling through signal-conducting media such as metal wires, optical fibers, and/or wireless transmission media (e.g., air and/or space). The quantum-key secured li-fi payment network described herein may transfer signals through air/space using (modulated) light signals.

In accordance with principles of the disclosure, FIG. 1 shows an illustrative block diagram of apparatus 100 that includes computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. Microprocessors 103 may also execute all software running on the computer 101—e.g., the operating system 117 and applications 119 such as a quantum key secured li-fi network payment application and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a quantum key secured li-fi network payment application and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a li-fi network, local area network (LAN) and a wide area network (WAN or the Internet) and may also include other types of networks. When used in li-fi network, the apparatus may include li-fi transmitter(s) and li-fi receiver(s), as well as quantum receivers and transmitters. These may be distinct from antennae used for other network types. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a quantum key secured li-fi network payment application and security protocols) along with any data needed for the operation of the apparatus. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113 or WAN connection.

Apparatus 100 may operate in a regular or li-fi networked environment supporting connections to one or more remote computers and servers, such as terminals 141 and 151, including, in general, the Internet and "cloud". Apparatus 100 may be connected to a li-fi network as well as another network (such as the Internet) at the same time, or different times. References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a li-fi network (not shown), local area network (LAN) 125 (the LAN may be the li-fi network) and a wide area network (WAN) 129 but may also include other networks. Computer 101 may include a network interface controller (not shown), which may include a modem 127 and LAN interface or adapter 113, as well as other components and adapters (not shown). When used in a LAN networking environment for an outside the li-fi network connection, computer 101 is connected to LAN 125 through a LAN interface or adapter 113. When used in a WAN networking environment for an outside the li-fi network connection, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies. These connections may be separate and distinct from the li-fi network described herein.

It will be appreciated that the network connections shown are illustrative and other means of establishing a communications link between computers may be used, especially a li-fi network protocol. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a quantum key secured li-fi network payment application and security protocols, as well as other programs. In an embodiment, one or more programs, or aspects of a program, may use one or more AI/ML algorithm(s). The various tasks may be related to receiving and processing payments over a li-fi network.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application. The terminals 151 and/or 141 may be point-of-sale terminals.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
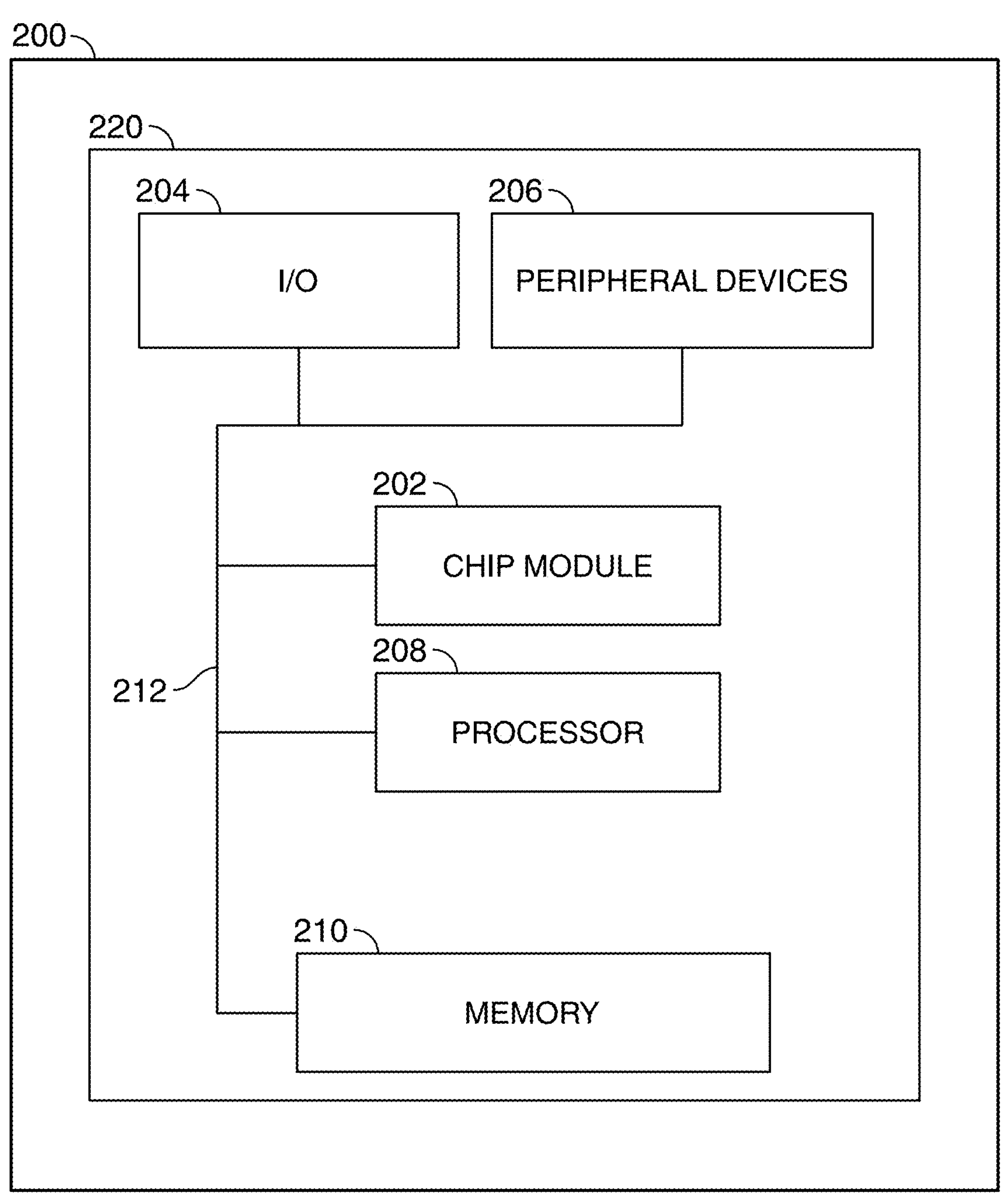
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
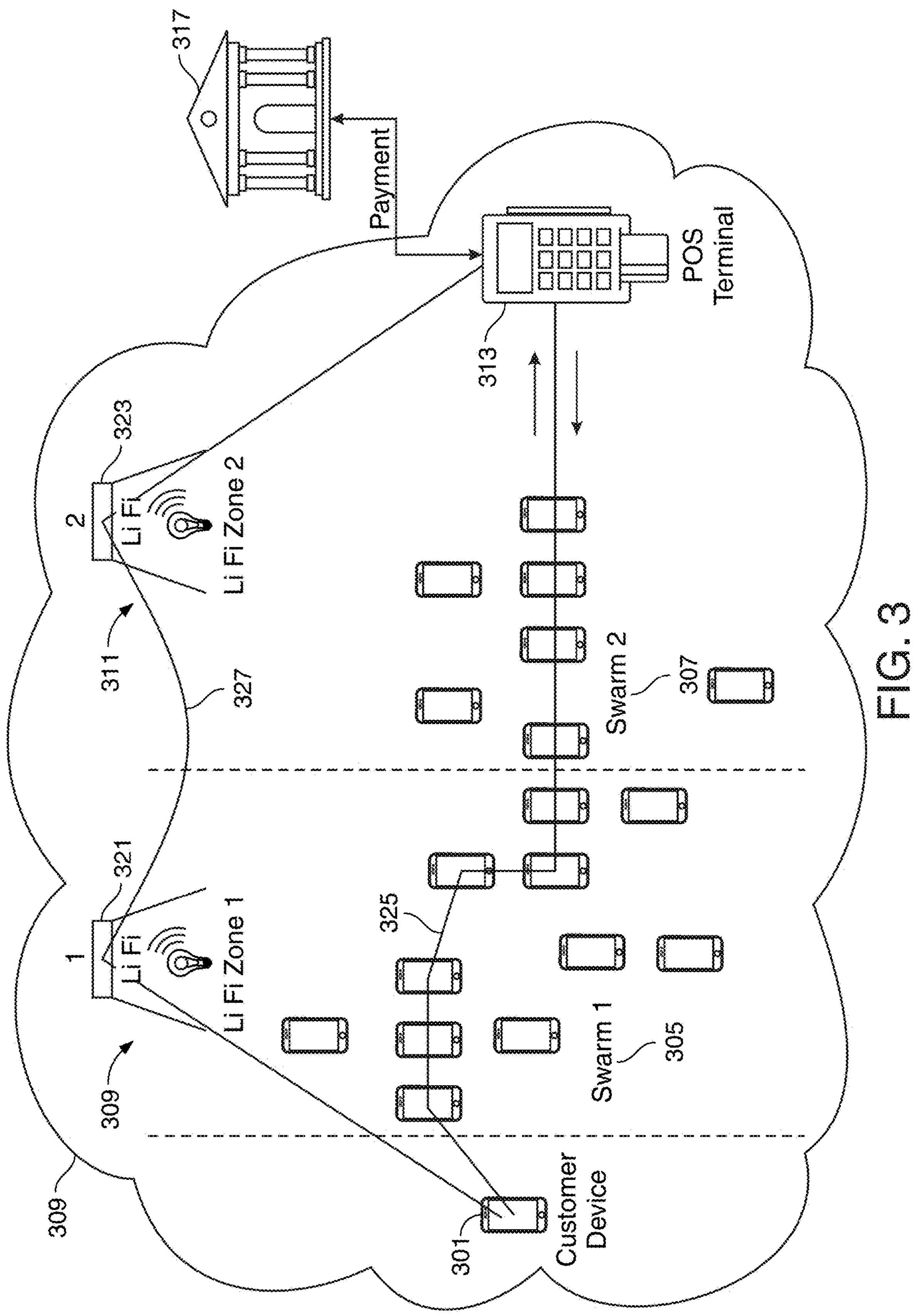
FIG. 3 shows an illustrative schematic in accordance with principles of the disclosure.

FIG. 3 shows an illustrative schematic in accordance with principles of the disclosure. Apparatus may include any of the components and systems odd-numbered 301 through 323, among other components.

A quantum-key secured li-fi payment network 319 may include multiple zones, including zone1 309 and zone2 311. Zone1 309 may include swarm1 305, central hub1 321, as well as other components. Zone2 311 may include swarm2 307 and central hub2 323, as well as other components.

Swarms 1 and 2 308 and 307 may include various computing devices, two or more in each zone. The computing devices (such as smartphones or other mobile computer devices) may be in communication with each other through the li-fi network 319.

A customer device 301 may or may not be within a zone. The customer device 301 may communicate with POS terminal 313 through the li-fi network 319.

Li-fi network 319 may include two or more channels. One channel may a standard channel 325. Payment data may be transmitted over channel 325.

One channel may be a quantum-key distribution channel 327. A quantum key distribution channel 327 may require equipment, such as POS terminal 313, customer device 301, central hubs 321 and 323, and other equipment, equipped with quantum capable receivers and transmitters. A quantum key may be transmitted over the light pulses forming the li-fi network 319.

The customer device 301 may communicate with POS terminal 313 through an optimal path or secure channel 325 through the li-fi network 319.

The POS terminal 313 may be within a zone of the li-fi network 319. POS terminal 313 may communicate with an outside financial institution 317 to process a payment 315. Communication with financial institution 317 may be through the li-fi network 319 or through an outside network, such as the Internet or other network.

Figure 4:
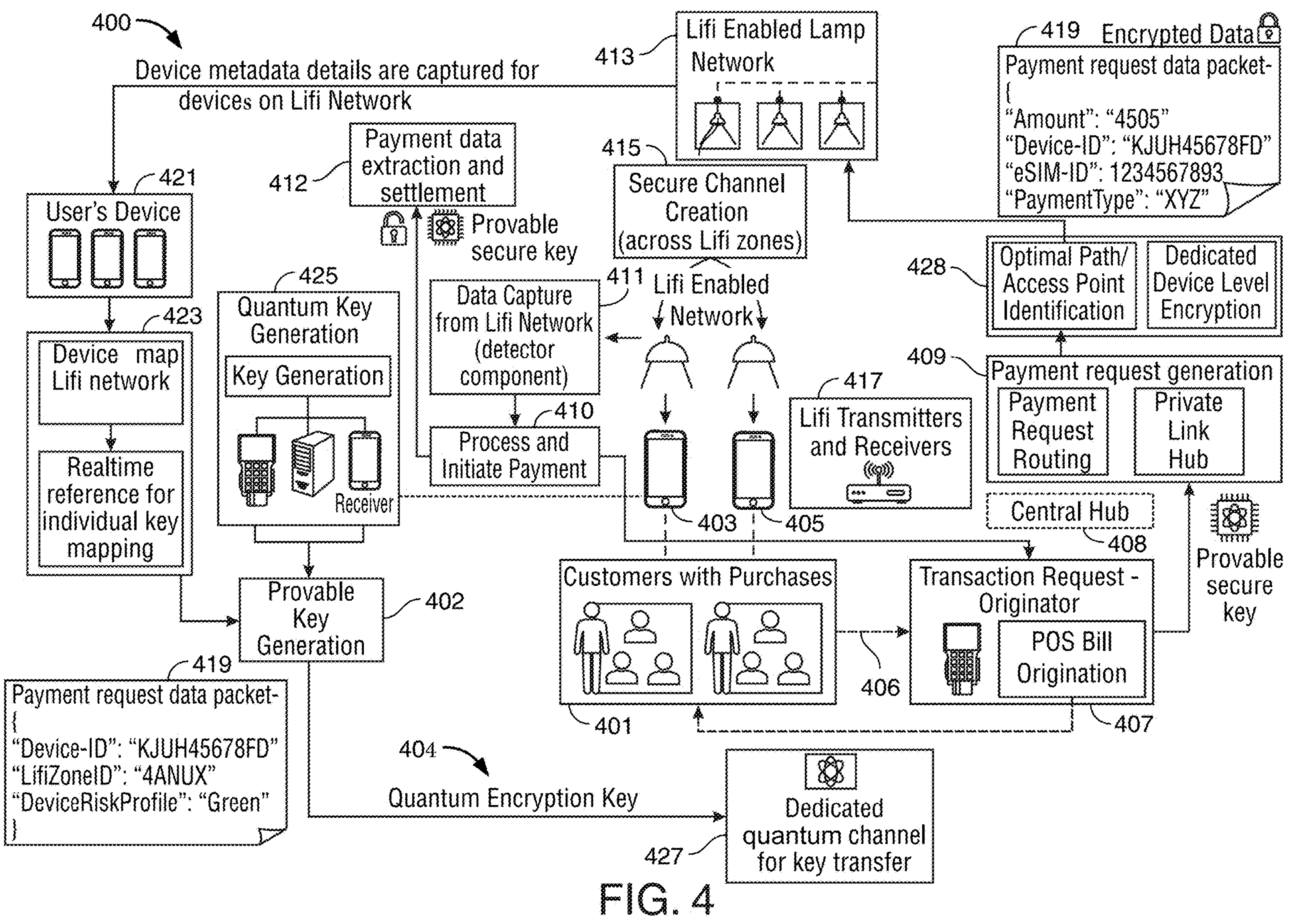
FIG. 4 shows an illustrative schematic in accordance with principles of the disclosure.

FIG. 4 shows an illustrative schematic in accordance with principles of the disclosure. Apparatus may include any of the components and systems odd-numbered 401 through 429, among other components, as well as steps 402-412 labeled on FIG. 4. Steps may be performed on the apparatus shown in FIGS. 1-4, and 6 or other apparatus shown in other figures or described elsewhere.

A plurality of customers 401 who have purchased goods or services may each have a customer mobile device 403 or 405, etc. Each customer device 403 or 405 may include li-fi and quantum components 417, such as li-fi transmitters, li-fi receivers, and quantum transmitters and receivers.

At step 400, device metadata for each device 421 on the li-fi network 413 may be captured. The device metadata may be used to create a device map 423. The device map 423 may be used to create a device risk profile for each device.

At step 402, a quantum key may be generated for a particular device through quantum components 425. The quantum key may be transmitted over a quantum key distribution channel 427 at step 404. The quantum key may be shared with a POS terminal 407.

At step 406, customers 401 may transmit a bill request with a payment method and quantum key to a POS terminal 407 to generate a bill. The transmission may be over a li-fi network 413. In an embodiment, the customers 401 may not transmit a payment method at step 402, but at a later step, after receiving a bill.

At step 408, the POS terminal 407 may transmit the bill to a central hub 409 for processing and generation. The central hub 409 may also determine an optimal route 429 as well as communicate with the POS terminal 407 and customers 401 over the li-fi network 413.

The li-fi network 413 may include routers and switches and li-fi transmitters and receivers.

At step 408, central hub 409 may transmit a bill along with payment request data 419 to customer devices 403 and 405 over li-fi network 413, as well as to POS terminal 407.

At step 408, central hub 409 may generate a second secure channel 415 on the li-fi network 413 between customer devices 403 and 405 and POS terminal 407 and transmit the bill information 419 over the secure channel 415. The second secure channel 415 should be a different channel than quantum key distribution channel 427.

At step 410, customer devices 403 and 405 may receive the bill information and transmit payment information to the POS terminal 407 or central hub 409 for payment processing at step 412.

Figure 5A:
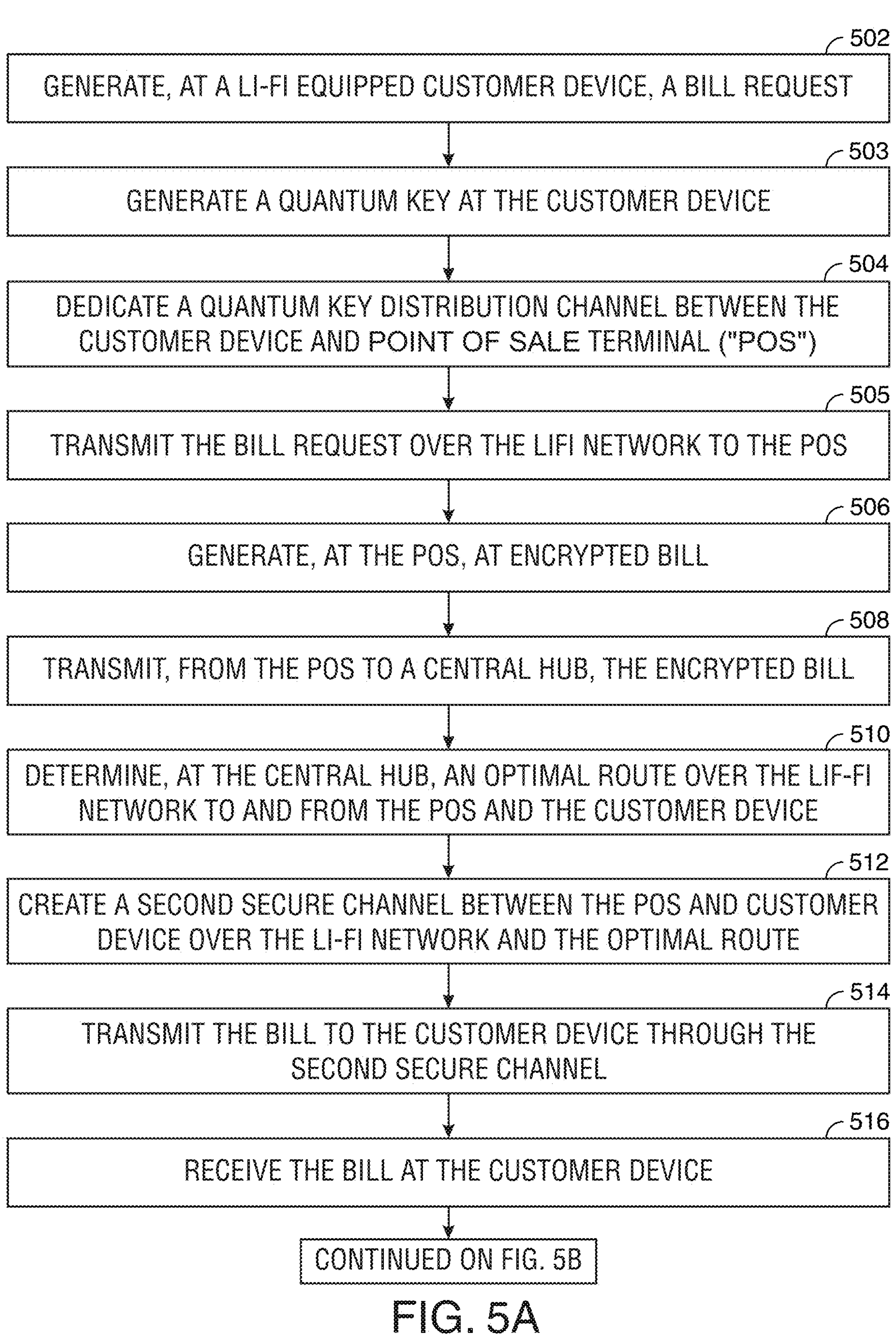
FIG. 5A shows a portion of an illustrative flowchart in accordance with principles of the disclosure.
Figure 5B:
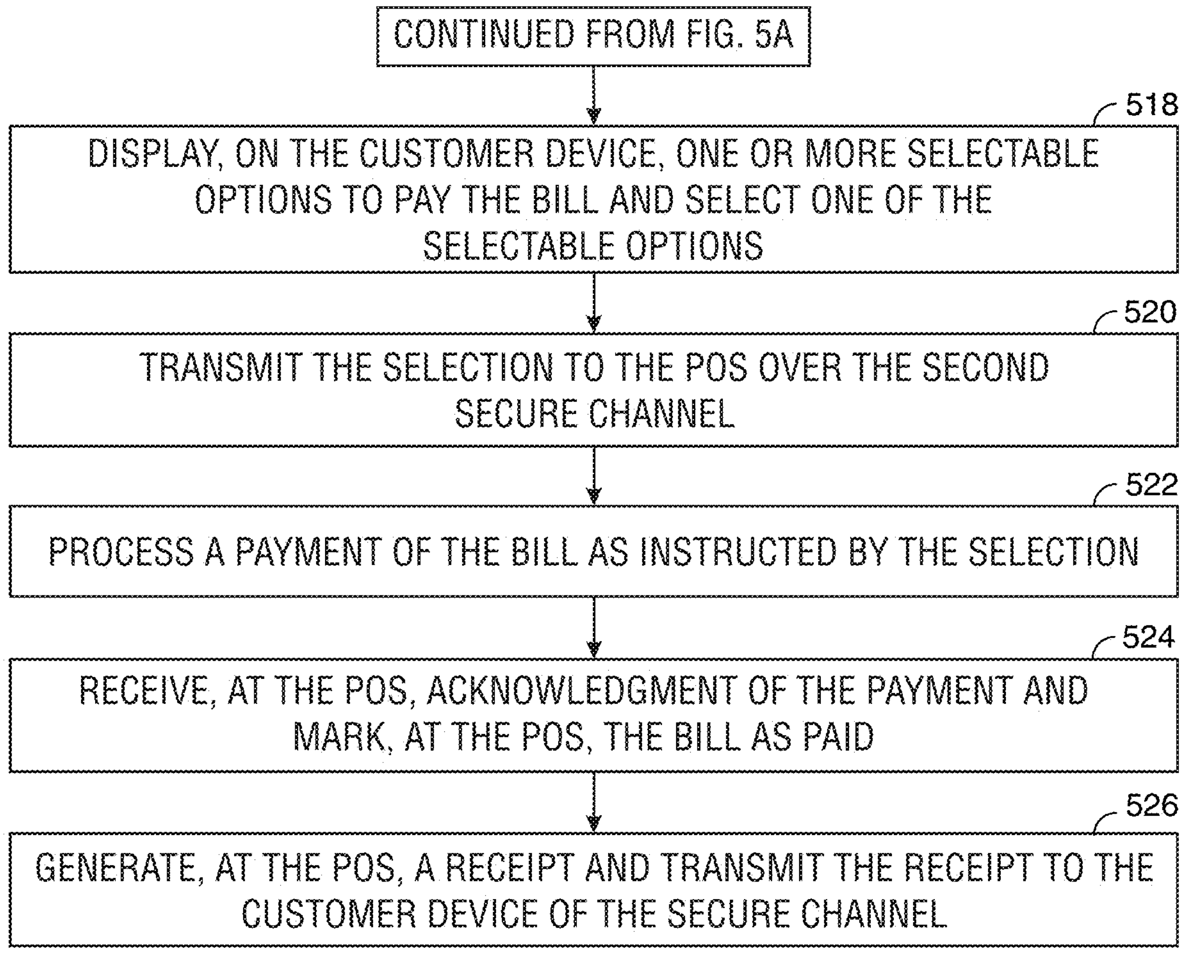
FIG. 5B shows the remainder of an illustrative flowchart in accordance with principles of the disclosure.

FIGS. 5A and 5B show, together, an illustrative flowchart in accordance with principles of the disclosure. Methods may include some or all of the method steps numbered 502 through 526. Methods may include the steps illustrated in FIGS. 5A-5B in an order different from the illustrated order. The illustrative method shown in FIG. 5 may include one or more steps performed in other figures or described herein. Steps 502 through 526 may be performed on the apparatus shown in FIGS. 1-4, 6 or other apparatus.

At step 502, a li-fi equipped customer device may generate a bill request. The bill request may include a quantum key and other data unique to the customer device. The customer may initiate the bill request. The bill request may be initiated automatically (e.g., after a pre-determined time). The bill request may be initiated upon a request from another device.

At step 503, the customer device may generate a quantum key.

At step 504, a quantum key distribution channel may be created/dedicated between the customer device and a li-fi and quantum equipped point-of-sale terminal ("POS"). In an embodiment, the quantum key distribution channel may include additional receivers/transmitters, such as a central hub.

At step 505, the customer device may transmit the bill request over a li-fi network to the POS. This transmission may be over a different channel than the quantum key distribution channel.

At step 506, the POS terminal may generate a bill encrypted with the quantum key provided by the customer device. Encrypting the bill may provide security as well as direct the bill to the correct customer.

At step 508, the POS terminal may transmit the bill to a central hub. The central hub may be a part of the li-fi network. The central hub may be in communication with the customer device or may be in communication with other devices or computers over the li-fi network.

At step 510, the central hub may determine an optimal route between the POS terminal and customer device over the li-fi network. The optimal route may be the shortest, fastest, most secure route. Other factors may also be evaluated and analyzed to determine the optimal route.

At step 512, the central hub may create a second secure channel over the li-fi network between the POS terminal and the customer device. The second secure channel may utilize the optimal route identified at step 510. The second secure channel must be different than the quantum key distribution channel created at step 504.

At step 514, the POS terminal may transmit the bill to the customer device through the second secure channel.

At step 516, the customer device may receive the bill generated by the POS terminal.

At step 518, the customer device may display one or more selectable options for the customer to pay the bill, such as a first credit card, a second credit card, a debit card, epay, echeck, or other options. The customer may select one of the selectable options.

At step 520, the customer device may transmit the selection, which may include information and data necessary to process a payment according to the selection, to the POS terminal over the second secure channel.

At step 522, the POS terminal may process the payment according to the selection. Processing the payment may include communicating with a server or computer system outside of the li-fi network through standard communication protocols.

At step 524, the POS terminal may receive an acknowledgment of the payment and mark the bill as paid.

At step 526, the POS terminal may generate a receipt and transmit the receipt to the customer device over the second secure channel.

Figure 6:
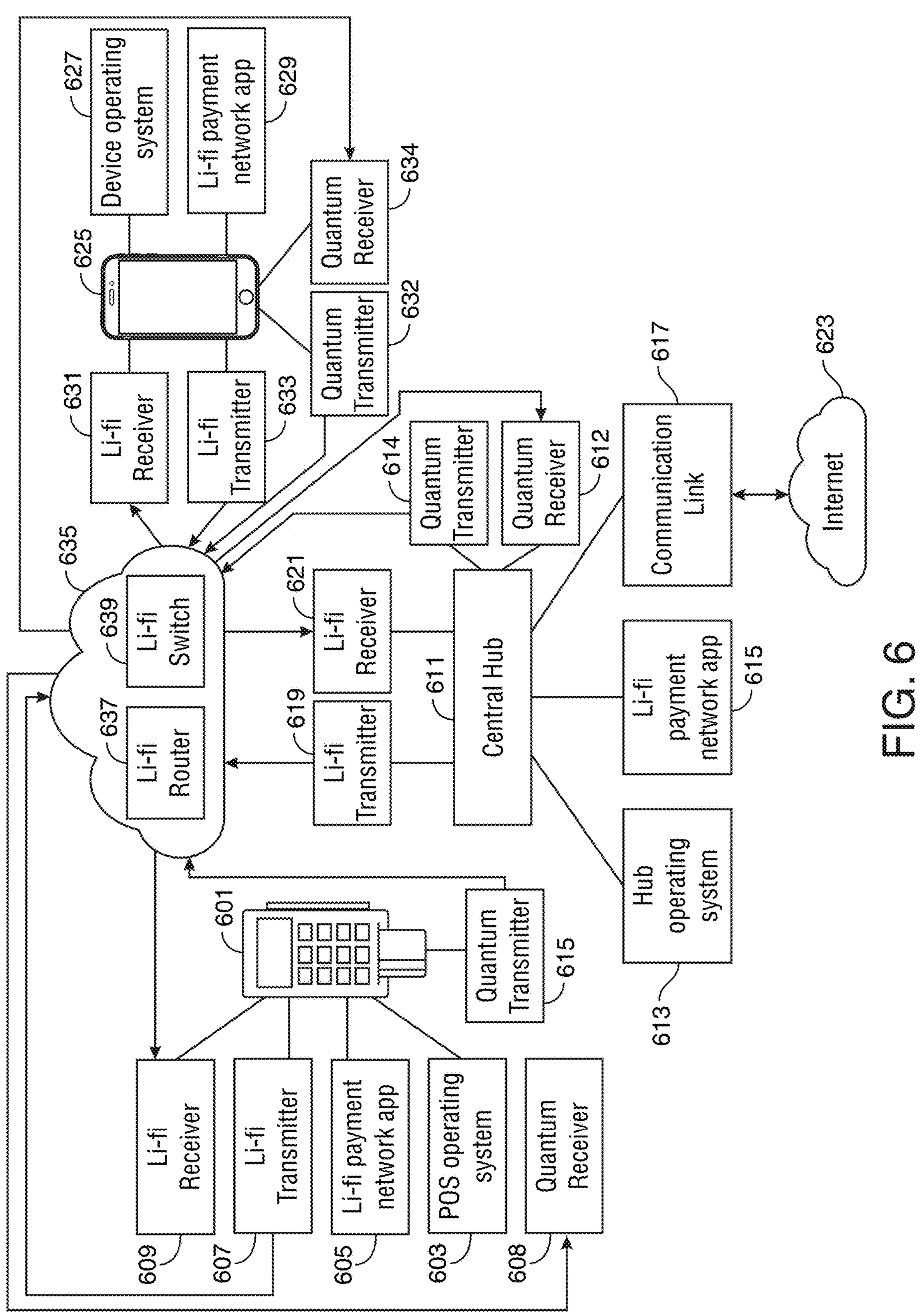
FIG. 6 shows an illustrative apparatus in accordance with principles of the disclosure.

FIG. 6 shows an illustrative apparatus in accordance with principles of the disclosure. The apparatus may include a point-of-sale terminal ("POS") 601, a central hub 611, a customer device 625, and a li-fi network 635.

The POS terminal 601 may include a POS operating system 603, a quantum-key secured li-fi payment network application 605, a li-fi transmitter 607, a li-fi receiver 609, a quantum receiver 608, and a quantum transmitter 610 among other components. The li-fi transmitter 607, li-fi receiver 609 quantum receiver 608, and the quantum transmitter 610 may communicate with the li-fi network 635.

The central hub 611 may include a hub operating system 613, a copy of the quantum-key secured li-fi payment network application 615, a communications link 617, a li-fi transmitter 619, a li-fi receiver 621, a quantum receiver 612, and a quantum transmitter 614 among other components. The communications link may communicate with an external network, such as the Internet 623. Li-fi transmitter 619, li-fi receiver 621, quantum receiver 612, and quantum transmitter 614 may communicate with the li-fi network 635.

In an embodiment, the central hub 611 may communicate directly with the POS terminal 601 and customer device 625 over their respective li-fi transmitters, li-fi receivers, quantum transmitters, and quantum receivers.

Customer device 625 may include a device operating system 627, a copy of the quantum-key secured li-fi payment network application 629, a li-fi receiver 631, a li-fi transmitter 631, a quantum transmitter 632, and a quantum receiver 634 among other components. Li-fi transmitter 633, li-fi receiver 631, quantum transmitter 632, and quantum receiver 634 may communicate with the li-fi network 635.

Li-fi network 635 may include a li-fi router 637 and a li-fi switch 639, among other components. The li-fi network may encompass the POS terminal 601, central hub 611, customer device 625, and other li-fi equipped computer systems and devices.

A customer (not shown) through the customer device 625, may transmit a bill request, including a quantum key unique to the customer device 625, over the li-fi network 635 to the central hub 611 or directly to the POS terminal 601.

The central hub 611 may transmit the bill request to the POS terminal 601.

The POS terminal 601 may generate a bill encrypted with the quantum key and specific to the customer and transmit the bill to the central hub 611 or customer device 625 over the li-fi network 635.

The central hub 611 may determine a route over the li-fi network 635. The route may be an optimal route.

The central hub may transmit the bill to the customer device 625 over the route.

The customer device 625 may receive the bill. The li-fi payment application 629 may present on the customer device 625, one or more selectable options to pay the bill to the customer.

The customer may select one of the one or more selectable options. The customer device 625 may transmit the selection to the central hub 611 or POS terminal 601 over the li-fi network 635.

The central hub 611 may transmit the selection to the POS terminal 601 over the li-fi network 635.

The central hub 611 may process the payment of the bill as instructed by the selection.

The POS terminal 601 may mark the bill as paid and generate a receipt.

The POS terminal 601 may transmit the receipt to the central hub 611 or customer device 625 over the li-fi network 635. The central hub 611 may transmit the receipt to the customer device 625 over the li-fi network 635.

Thus, apparatus and methods for a quantum-key secured li-fi payment network are provided. Persons skilled in the art will appreciate that the present invention can be practiced by other than the described embodiments, which are presented for purposes of illustration rather than of limitation.

What is claimed is:

1. An apparatus for a quantum-key secured li-fi payment network, the apparatus comprising:

a li-fi equipped point-of-sale terminal ("POS") including:
- a POS operating system;
- a quantum-key secured li-fi payment network application;
- one or more POS li-fi transmitters;
- one or more POS li-fi receivers;
- a quantum receiver;

a li-fi network including:
- one or more li-fi routers; and
- one or more li-fi switches;

one or more li-fi equipped customer devices, each including:
- a customer device operating system;
- the quantum-key secured li-fi payment network application;
- one or more customer device li-fi transmitters;
- one or more customer device li-fi receivers; and
- a quantum transmitter; and one or more central hubs, each central hub including:
- a central hub operating system;
- the quantum-key secured li-fi payment network application;
- one or more central hub li-fi transmitters;
- one or more central hub li-fi receivers;
- a central hub communication link;
- a quantum transmitter; and
- a quantum receiver;

wherein:

when a customer, through one of the one or more customer devices, transmits a bill request over the li-fi network to one of the one or more central hubs:
- a quantum key distribution channel is created by and between the customer device, the one or more central hubs, and the POS;
- a quantum key unique to the one of the one or more customer devices is transmitted by the customer device over the quantum key distribution channel;
- the one of the one or more central hubs transmits the bill request to the POS;
- the POS terminal generates a bill, encrypted with the quantum key, specific to the customer, and transmits the bill to the one of the one or more central hubs;
- the one of the one or more central hubs determines a route over the li-fi network, wherein the route is determined through one or more artificial intelligence/machine learning ("AI/ML") algorithms;
- the one of the one or more central hubs transmits the bill to the customer device over the route;
- the customer's device receives the bill; and
- the li-fi payment application presents, on the customer's device, one or more selectable options to pay the bill; and when the customer selects one of the one or more selectable options:
- the customer's device transmits the selection to one of the one or more central hubs over the li-fi network;
- the one of the one or more central hubs transmits the selection to the POS terminal over the li-fi network;
- the one of the one or more central hubs pays the bill as instructed by the selection;
- the POS terminal marks the bill as paid;
- the POS terminal generates a receipt;
- the POS terminal transmits the receipt to the one of the one or more central hubs over the li-fi network; and
- the one of the one or more central hubs transmits the receipt to the customer's device over the li-fi network.

2. The apparatus of claim 1 wherein the li-fi network further includes two or more zones and each zone includes:
- one of the one or more li-fi routers;
- one of the one or more li-fi switches;
- one of the one or more central hubs; and
- one or more of the one or more li-fi equipped customer devices.

3. The apparatus of claim 1 wherein each of the one or more central hubs is bypassed.

4. The apparatus of claim 1 wherein one of the one or more li-fi equipped customer devices acts as one of the one or more central hubs.

* * * * *